(12) United States Patent
Ohms

(10) Patent No.: US 11,301,058 B2
(45) Date of Patent: Apr. 12, 2022

(54) METHOD FOR ASCERTAINING A USER INPUT, AND MEDIA DEVICE

(71) Applicant: Robert Bosch GmbH, Stuttgart (DE)

(72) Inventor: Torsten Ohms, Vaihingen/Enz-Aurich (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/200,237

(22) Filed: Mar. 12, 2021

(65) Prior Publication Data
US 2021/0294434 A1 Sep. 23, 2021

(30) Foreign Application Priority Data
Mar. 20, 2020 (DE) .......................... 102020203615.2

(51) Int. Cl.
*H04R 1/10* (2006.01)
*G06F 3/0346* (2013.01)

(52) U.S. Cl.
CPC ......... *G06F 3/0346* (2013.01); *H04R 1/1016* (2013.01); *H04R 1/1041* (2013.01)

(58) Field of Classification Search
CPC .. G06F 3/03346; H04R 1/1016; H04R 1/1041
See application file for complete search history.

(56) References Cited

U.S. PATENT DOCUMENTS

| 2012/0114132 A1* | 5/2012 | Abrahamsson ......... H04S 7/304 381/74 |
| 2013/0335226 A1 | 12/2013 | Shen et al. |
| 2015/0009187 A1* | 1/2015 | Mercea ............... G06F 3/03545 345/179 |

OTHER PUBLICATIONS

Liu, et al.: "Toward Detection of Unsafe Driving with Wearables", Proceedings of the 2015 Workshop on Wearable Systems and Applications, (2015), pp. 27-32.

* cited by examiner

*Primary Examiner* — Simon King
(74) *Attorney, Agent, or Firm* — Norton Rose Fulbright US LLP; Gerard Messina

(57) ABSTRACT

A method for ascertaining a user input of a user of a first element and of a second element, the first element and the second element being electronic media devices or components of electronic media devices or of an electronic media device, the first element including an inertial sensor unit, in particular a rotation rate sensor unit. The method includes: outputting a sensor signal, by the inertial sensor unit, as a function of a motion of the first element; ascertaining a relative motion of the first element with reference to the second element by utilizing the output sensor signal, an overall motion of the first element being composed of an absolute motion and the relative motion, and the absolute motion of the first element being at least partially compensated for by utilizing the output sensor signal; and ascertaining the user input as a function of the ascertained relative motion.

11 Claims, 2 Drawing Sheets

METHOD FOR ASCERTAINING A USER INPUT, AND MEDIA DEVICE

CROSS REFERENCE

The present application claims the benefit under 35 U.S.C. § 119 of German Patent Application No. DE 102020203615.2 filed on Mar. 20, 2020, which is expressly incorporated herein by reference in its entirety.

FIELD

The present invention relates to a method for ascertaining a user input. Moreover, the present invention relates to a media device.

BACKGROUND INFORMATION

Electronic media devices, such as in-ear headphones, smart watches, smartphones, tablet PCs, and the like, are controlled via user inputs. For this purpose, the user may, for example, touch the electronic media device. For example, tapping twice on the device within a short time interval may be detected, in order to switch a device on or off. This may be advantageous in the case of in-ear headphones, since the user, as a result, does not need to directly access an appropriate media device, for example, a smartphone. Rather, the user may generate a control signal directly via the easily accessible in-ear headphones, which controls the appropriate media device.

In order to detect the control signal, the in-ear headphones may include inertial sensors, which measure the accelerations of the in-ear headphones, which have arisen due to the tapping. If a double acceleration is detected within a short interval, the appropriate control signal is generated.

In the evaluation of the sensor signals of the inertial sensors, typical relative motions of various elements are not taken into account, however. There is a need, therefore, to better take into account the motions of electronic media devices or of components of electronic media devices with respect to one another.

SUMMARY

The present invention provides a method for ascertaining a user input of a user of a first element and a second element. In addition, the present invention provides a media device including a first element and a second element.

Preferred specific example embodiments of the present invention are described herein.

According to a first aspect, the present invention relates to a method for ascertaining a user input of a user of a first element and a second element, the first element and the second element being electronic media devices or components of electronic media devices or of an electronic media device, and the first element including an inertial sensor unit. The inertial sensor unit may be, in particular, a rotation rate sensor unit. In accordance with an example embodiment of the present invention, a sensor signal is output by the inertial sensor unit as a function of a motion of the first element. By utilizing the output sensor signal, a relative motion of the first element is ascertained with reference to the second element, an overall motion of the first element being composed of an absolute motion and the relative motion, and the absolute motion of the first element being at least partially compensated for by utilizing the output sensor signal. The user input is ascertained as a function of the ascertained relative motion.

According to a second aspect, the present invention relates to a media device including a first element and a second element, the first element and the second element being electronic media devices or components of electronic media devices or of an electronic media device. The first element includes an inertial sensor unit, in particular a rotation rate sensor unit. In accordance with an example embodiment of the present invention, the inertial sensor unit is designed for outputting a sensor signal as a function of a motion of the first element. The media device also includes an ascertainment unit, which is designed for ascertaining a relative motion of the first element with reference to the second element by utilizing the output sensor signal, an overall motion of the first element being composed of an absolute motion and the relative motion, and the ascertainment unit being designed for at least partially compensating for the absolute motion of the first element by utilizing the output sensor signal. In addition, the ascertainment unit ascertains a user input of a user of the first element and of the second element as a function of the ascertained relative motion.

In accordance with an example embodiment of the present invention, control signals may be better identified by ascertaining a relative motion of the first element with reference to the second element. Here, the absolute motion of the user may be better detected and compensated for. If the user wears, for example, in-ear headphones, accelerations may occur due to natural head motions or during the possible motorized travel of the user, which should not be confused with actual control motions of the user. In contrast to the control motions of the user, the inadvertent, naturally occurring motions typically affect all elements in the same way, however. By compensating for the absolute motion, the actually relevant control signal, which corresponds to the relative motion of the elements, may be extracted as a result.

The present invention therefore allows for a better determination of the user input generated by a user. In addition, certain relative motions may be ascertained, for example, a twisting of the first element in relation to the second element. Such motions may therefore be utilized as user input.

In particular, in the case of wearables, for example, in-ear headphones, due to the diminishing installation space, the space for switches and other operating elements is diminishing. In addition, there are requirements on waterproofness, in order to configure the devices to be robust with respect to environmental influences. Therefore, a closed housing including preferably few subdivisions is worthwhile. The utilization of the inertial sensor unit also allows for a control in hermetic housings due to motion sensitivity.

Moreover, various devices of a platform couple to an increasingly stronger extent spatially while retaining the same functionality. The devices communicate, for example, provided they are located in the same WiFi network. As a result, the transmitting unit and the receiving unit may wind up spatially far apart from one another, an operation directly at the wearable nevertheless being desirable. This may be facilitated by the determination of the relative velocity.

As compared to conventional gesture control methods, control via tapping, and touchscreen control, the method for ascertaining the user input allows for new dimensions of motion detection, for example, with respect to turning motions and gestures. By detecting the relative motion, the ascertainment of the user input is essentially independent of the state of activity of the user. Due to the use of radio interfaces, the control may also take place across greater spatial distances. Due to the utilization of inertial sensors in mobile terminals, which is already comprehensive nowadays, the method may also be usually implemented in an easy way without additional hardware.

According to one further specific embodiment of the method for ascertaining a user input in accordance with the present invention, the second element includes one further inertial sensor unit, which outputs a further sensor signal as a function of a motion of the second element. The at least partial compensation for the absolute motion of the first element takes place by utilizing the output sensor signal and the further output sensor signal. By utilizing two inertial sensor units, the relative motion may be determined with high accuracy.

According to one further specific embodiment of the method for ascertaining a user input in accordance with the present invention, the at least partial compensation for the absolute motion of the first element takes place by utilizing a difference signal between the sensor signal and the further sensor signal. The difference signal depends only on the relative motion, so that the absolute motion is compensated for.

According to one further specific embodiment of the method for ascertaining a user input in accordance with the present invention, the at least partial compensation for the absolute motion of the first element includes processing the output sensor signal with the aid of a discriminator or a high-pass filter, in order to separate the faster relative motion from the slower absolute motion. In this case, it may suffice to provide a single inertial sensor unit, i.e., it is not absolutely necessary that all elements include a separate inertial sensor unit.

According to one further specific embodiment of the method for ascertaining a user input in accordance with the present invention, the first element and/or the second element are/is rotary components of electronic media devices or of an electronic media device.

According to one further specific embodiment of the method for ascertaining a user input in accordance with the present invention, the first element and the second element are the two earphones of in-ear headphones or particular components of the two earphones. In particular, the elements may be rotary components of the earphones. In this case, the user may trigger a certain user input by rotating the earphones. For example, it may be provided that the user adapts a sound level, a pitch, or the like, by rotating the earphones.

According to one further specific embodiment of the method for ascertaining a user input in accordance with the present invention, the electronic media devices include at least one image capturing device, an image display device, an electronic musical instrument, a smart watch, a smartphone, and a tablet PC.

According to one further specific embodiment of the method for ascertaining a user input in accordance with the present invention, in addition, a trigger signal is detected, the output of the sensor signal and/or the ascertainment of the relative motion being carried out only after the trigger signal is detected. The trigger signal may be, for example, a fast motion of the first element and/or the second element, which may also need to repeatedly occur. For example, it may be detected that the acceleration of the first element and/or of the second element exceeds a predefined threshold value two or more times within a predefined period of time.

According to one further specific embodiment of the method for ascertaining a user input in accordance with the present invention, at least one function of the electronic media device or of the electronic media devices and/or of an external electronic device is controlled as a function of the user input.

BRIEF DESCRIPTION OF THE DRAWINGS

In all figures, identical or functionally identical elements and devices are labeled with the same reference numerals. The numbering of method steps is provided for the sake of clarity and, in general, is not to imply a certain chronological order.

In particular, multiple method steps may also be carried out simultaneously.

DETAILED DESCRIPTION OF EXAMPLE EMBODIMENTS

Figure 1:
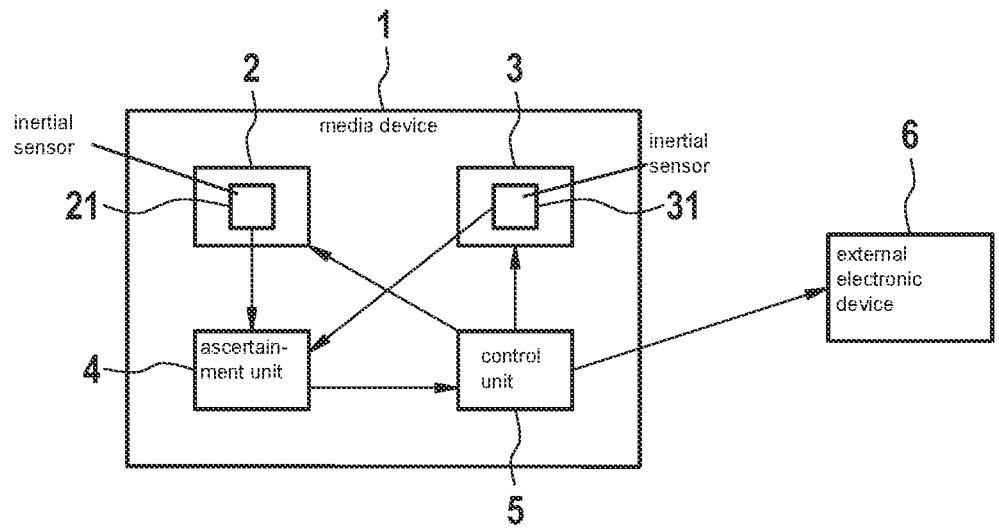
FIG. 1 shows a schematic block diagram of a media device according to one specific example embodiment of the present invention.

FIG. 1 shows a schematic block diagram of a media device 1. Media device 1 includes a first element 2 and a second element 3. First element 2 and second element 3 may each be electronic media devices. For example, first element 2 may be a smart watch and second element 3 may be a tablet PC, a smartphone, a camera, or the like, first element 2 being provided for controlling second element 3. For example, a wearable may be coupled to a smartphone or computer and control this, relative motions being differentiated from absolute motions, which may be advantageous, for example, during a train ride.

In general, first element 2 and second element 3 may each be an electronic media device or components of an electronic media device or components of various electronic media devices. The media devices may be, for example, image capturing devices, i.e., in particular photo cameras or video cameras, image display devices, electronic musical instruments, smart watches, smartphones, tablet PCs, headphones, in particular in-ear headphones, or the like.

First element 2 includes a first inertial sensor unit 21. Inertial sensor unit 21 may include at least one rotation rate sensor, an acceleration sensor, or the like. Second element 3 includes a further inertial sensor unit 31. This is optional, however, and, according to further specific embodiments, may be omitted.

Media device 1 further includes an ascertainment unit 4, which is coupled to first inertial sensor unit 21 and second inertial sensor unit 31. Ascertainment unit 4 includes a microprocessor, an integrated circuit, an FPGA, or the like, and at least one memory and is designed for the purpose of receiving and further processing sensor signals output by first inertial sensor unit 21 and second inertial sensor unit 31.

Optionally, it may be provided that a trigger signal is to be initially detected, before ascertainment unit 4 further evaluates the sensor signals, in order to ascertain a user input. The trigger signal may be generated via an external electronic component or via the electronic media device. The trigger signal may also be ascertained, however, on the basis of the sensor signals of first inertial sensor unit 21 and/or second inertial sensor unit 31. For example, a certain sequence of accelerations may be ascertained, for example, a "double tap" signal, i.e., a double or also multiple tapping in a short time interval onto first element 2 or second element 3. According to specific embodiments, the trigger signal may be generated by a movement of element 2, 3, by a voice input, a switch actuation, a radio circuit, or by an environmental influence, for example, an elevated noise level, or the like.

As soon as the trigger signal is detected, ascertainment unit 4 calculates, on the basis of the sensor signals, a relative motion of first element 2 with respect to second element 3.

The overall motion of the first element is composed of an absolute motion and the relative motion. As a function of the sensor signals, ascertainment unit 4 at least partially compensates for the absolute motion of first element 2. This may be understood to mean that ascertainment unit 4 essentially completely deducts the absolute motion, so that only the relative motion remains.

For example, ascertainment unit 4 may ascertain a motion of first element 2 on the basis of the sensor signals of first inertial sensor unit 21 and ascertain a motion of second element 3 on the basis of the sensor signals of second inertial sensor unit 31. This may be understood to mean that ascertainment unit 4 calculates vector-valued velocities and/or accelerations of particular element 2, 3. Through difference formation, ascertainment unit 4 may ascertain the relative motion of elements 2, 3 with respect to one another, i.e., compensate for the absolute motion in a world coordinate system. Ascertainment unit 4 therefore calculates a difference signal between the sensor signal and the further sensor signal, in order to calculate the relative motion.

In addition, it may be provided that ascertainment unit 4 processes the output sensor signal of first inertial sensor unit 21 with the aid of a discriminator or a high-pass filter. As a result, slower motions, which correspond to the absolute motion of first element 2, may be eliminated or compensated for. Only signal components of the faster relative motion remain.

As a function of the ascertained relative motion of first element 2 in relation to second element 3, ascertainment unit 4 ascertains a user input of the user. The user input may be a (de-)activation signal, i.e., the electronic media device or the electronic media devices may be activated or deactivated on the basis of the sensor signal. In addition, certain functions of the electronic media device or of the electronic media devices may also be controlled. For example, a sound level, a pitch, a media file to be played back, a zoom of an image or video, a playback speed, aperture settings, exposure times, certain electronic effects, or the like, may be controlled or adjusted with the aid of the user input.

In addition, a control unit 5 is provided, which controls operating parameters of the electronic media devices and/or of an external device on the basis of the user input.

Figure 2:
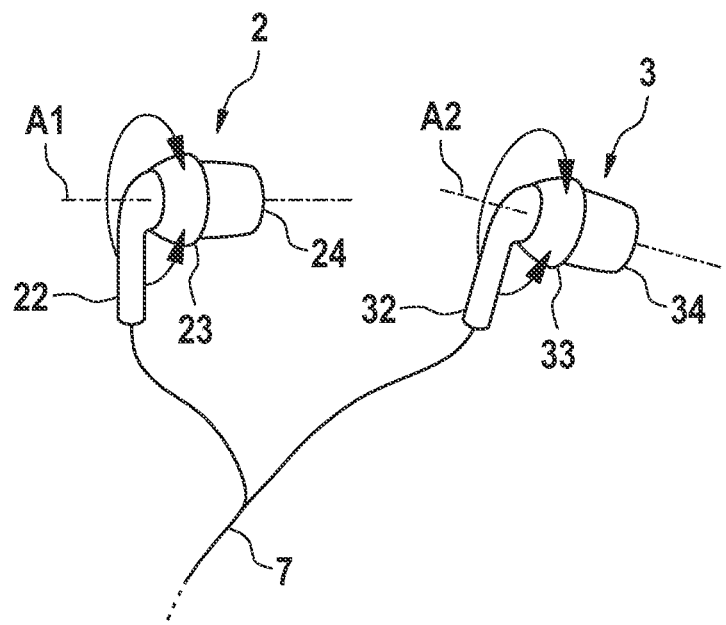
FIG. 2 shows a schematic representation of in-ear headphones according to one specific example embodiment of the present invention.

FIG. 2 shows a schematic representation of in-ear headphones including a left earphone 2 and a right earphone 3. In the specific embodiment shown, earphones 2, 3 are connected to a media device (not represented) via a cable connection 7. Earphones 2, 3 may also communicate with the media device via a wireless radio link, however. Earphones 2, 3 each include an outer ear bud 22, 32 and a flexible end piece 24, 34 for insertion into the ear. In addition, earphones 2, 3 each include a rotary component 23, 33, which are rotatable about axes A1, A2 in relation to ear buds 22, 32 and end pieces 24, 34. Inertial sensor units are integrated into rotary components 23, 33, in order to ascertain a motion of components 23, 33.

According to one further specific embodiment, it may be provided that earphones 2, 3 do not include rotary components, but rather may be rotated in their entirety in the ear. For this purpose, earphones 2, 3 may preferably be symmetrically designed.

By rotating rotary components 23, 33 or earphones 2, 3 themselves, a user may change certain parameters. For example, the user may adapt the sound level of appropriate earphone 2, 3 or both earphones 2, 3, change the pitch characteristics, adjust the balance, increase or decrease the playback speed, select a title to be played back, change the scanning rate, increase or decrease the degree of compression, change the sound quality, or activate a mute function of one or multiple channel(s).

The present invention is not limited to the use of in-ear headphones. In this way, it may be further provided that an image capturing device, for example, a camera, or an image display device, for example, a television, is controlled on the basis of relative motions. Possible functions to be controlled encompass, for example, changing a zoom, a remote activation, adjusting an aperture, changing an exposure time, adjusting the focal plane, adjusting an ISO value of the image capturing device, or the like.

In addition, it may be provided that an electronic musical instrument is controlled with the aid of a wearable. This may be located, for example, at the foot or wrist of a user of the electronic musical instrument. Possible adjustable effects encompass selecting or adjusting sound effects at an electric guitar, controlling a soft pedal, sostenuto pedal, sustain pedal, or the like, at a mobile keyboard, or controlling a bow substitute of an electric violin.

In addition, it may be provided to enable the gesture control in a vehicle in relation to an installed infotainment system of the vehicle. For this purpose, the user input of the user is ascertained on the basis of a motion, for example, of a wearable, absolute motions of the wearable, i.e., of first element 2, and of the infotainment system, i.e., of second element 3, being compensated for.

In addition, it may be provided that a user input is generated by a smart watch with the aid of a relative motion with respect to a paired tablet PC or smartphone. For example, the user may scroll through an e-book, in that a gesture is detected by a sensor of a smart watch. Further possibilities are to scroll in a selection menu by turning the wrist, zooming, and remote activation of a camera, or the like.

Figure 3:
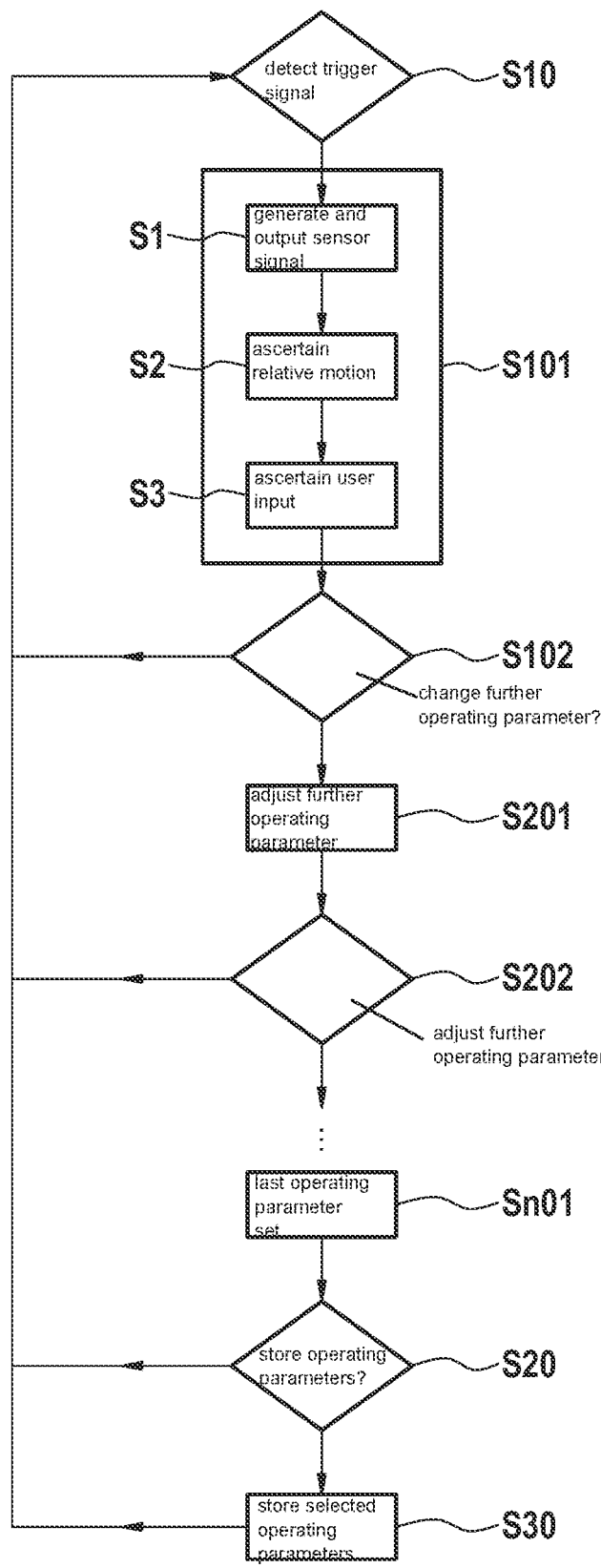
FIG. 3 shows a flowchart of a method for ascertaining a user input according to one specific example embodiment of the present invention.

FIG. 3 shows a flowchart of a method for ascertaining a user input.

In a first method step S10, a trigger signal is detected. The trigger signal may be ascertained on the basis of a motion of first element 2 and/or second element 3, on the basis of a voice input, a switch actuation, a radio circuit, or on the basis of an environmental influence.

If the trigger signal is detected, the ascertainment of the user input of a user of first element 2 and of second element 3 takes place in a subsequent step S101.

For this purpose, in a first substep S1, a sensor signal is generated and output by an inertial sensor unit 21 of first element 2.

In one further substep S2, an ascertainment unit 4 ascertains a relative motion of first element 2 with respect to second element 3 by utilizing the output sensor signal. Here, the ascertainment unit compensates for an absolute motion of first element 2, so that only the relative motion of first element 2 with respect to second element 3 remains.

In one further substep S3, ascertainment unit 4 ascertains the user input, the ascertained relative motion being evaluated.

During step S101, a first operating parameter of the electronic media device or of the electronic media devices may be adjusted.

In addition, in a step S102, it may be detected whether the user would like to change a further operating parameter. If this is not the case, the previously adjusted operating parameters are stored and a trigger signal S10 is once again awaited. It may also be provided that the user aborts the storing of the operating parameters.

If the user would like to adjust one further operating parameter, this takes place in a step S201 analogous to step S101. A query takes place once again, regarding whether the user would like to adjust one further operating parameter, step S202. The described steps of adjusting and subsequent querying may be repeated for as long as it takes until the last operating parameter is set, step Sn01, n representing the number of operating parameters.

In one further method step S20, the user may select whether the operating parameters are to be stored. If this is not the case, the user inputs are discarded and step S10 is repeated. Otherwise, the selected operating parameters are stored, step S30. A trigger signal is once again awaited, step S10.

For example, the adjustment of operating parameters of in-ear headphones may take place with the aid of the described method. The method may be triggered by a "double tap" on one of the earphones 2, 3, via voice input or rapid twisting.

In addition, a switch may be made to sound level regulation, to balance regulation, or to pitch adjustment, for example, by rotating earphones 2, 3 or components 23, 33 of earphones 2, 3. The adjustment may be acoustically reported back to the user before it is actually implemented. As a result, for example, an inadvertent overloading of the hearing may be avoided. For example, a warning message may be output ("Caution sound level greater than 80 dB(A). This is very loud. Please confirm."). In one further step, further operating parameters, for example, the balance at left earphone 2, may be adjusted by twisting. The variable utilized here is the difference between the detected rotary motions at the left channel and the right channel, optionally discriminated with the aid of a threshold level, in order to suppress noise or involuntary motions. As a result, synchronous motions, for example, head motions, are differentiated from hand motions. Further possible adjustable parameters may include changing the pitch characteristics. For example, high tones may be adjusted at one of the earphones 2 and bass may be adjusted at the other earphone 3.

After toggling through all adjustment measures, the control mode may be terminated, so that no further inadvertent adjustment measures may be triggered, for example, by one of the earphones 2, 3 falling out. Optionally, an additional confirmation may be required.

What is claimed is:

1. A method for ascertaining a user input of a user of a first element and of a second element, the first element and the second element being electronic media devices or components of electronic media devices or of an electronic media device, the first element including an inertial sensor unit, the method comprising the following steps:
   outputting a sensor signal, by the inertial sensor unit, as a function of a motion of the first element;
   ascertaining a relative motion of the first element with reference to the second element by utilizing the output sensor signal, an overall motion of the first element being composed of an absolute motion and the relative motion, and in the ascertaining of the relative motion, the absolute motion of the first element is at least partially compensated for by utilizing the output sensor signal; and
   ascertaining the user input as a function of the ascertained relative motion.

2. The method as recited in claim 1, wherein the inertial sensor unit is a rotation rate sensor unit.

3. The method as recited in claim 1, wherein the second element includes one further inertial sensor unit, which outputs one further sensor signal as a function of a motion of the second element, and wherein the at least partial compensation for the absolute motion of the first element takes place by utilizing the output sensor signal and the further output sensor signal.

4. The method as recited in claim 3, wherein the at least partial compensation for the absolute motion of the first element takes place by utilizing the output sensor signal by utilizing a difference signal between the sensor signal and the further sensor signal.

5. The method as recited in claim 1, wherein the at least partial compensation for the absolute motion of the first element includes processing the output sensor signal using a discriminator or a high-pass filter, to separate a faster relative motion from a slower absolute motion.

6. The method as recited in claim 1, wherein the first element and/or the second element are rotary components of electronic media devices or of an electronic media device.

7. The method as recited in claim 1, wherein the first element and the second element are earphones of in-ear headphones or are particular components of the two earphones.

8. The method as recited in claim 1, wherein the electronic media devices include: an image capturing device, and/or an image display device, and/or an electronic musical instrument, and/or a smart watch, and/or a smartphone, and/or a tablet PC.

9. The method as recited in claim 1, further comprising:
   detecting a trigger signal;
   wherein the output of the sensor signal and/or the ascertainment of the relative motion is carried out only after the trigger signal is detected.

10. The method as recited in claim 1, wherein at least one function of the electronic media device or of the electronic media devices and/or of an external electronic device is controlled as a function of the user input.

11. A media device, comprising:
   a first element;
   a second element, the first element and the second element being electronic media devices or components of electronic media devices or of an electronic media device, the first element including an inertial sensor unit, which is configured to output a sensor signal as a function of a motion of the first element; and
   an ascertainment unit configured to:
      ascertain a relative motion of the first element with reference to the second element by utilizing the output sensor signal, an overall motion of the first element being composed of an absolute motion and the relative motion, and, in the ascertainment of the relative motion, the ascertainment unit being configured to at least partially compensate for the absolute motion of the first element by utilizing the output sensor signal, and
      ascertain a user input of a user of the first element and of the second element as a function of the ascertained relative motion.

* * * * *